(12) United States Patent
Ohkubo et al.

(10) Patent No.: US 10,308,791 B2
(45) Date of Patent: Jun. 4, 2019

(54) DAMPING-IMPARTING COMPOSITION HAVING HIGH IMPACT DURABILITY AT LOW TEMPERATURE

(71) Applicant: Henkel AG & Co. KGaA, Duesseldorf (DE)

(72) Inventors: Makoto Ohkubo, Yokohama (JP); Shingo Tsuno, Yokohama (JP); Takao Tsukimori, Toyota (JP)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 15/617,775

(22) Filed: Jun. 8, 2017

(65) Prior Publication Data

US 2017/0267842 A1  Sep. 21, 2017

Related U.S. Application Data

(63) Continuation of application No. PCT/JP2015/084766, filed on Dec. 11, 2015.

(30) Foreign Application Priority Data

Dec. 12, 2014 (JP) .................................. 2014-252439

(51) Int. Cl.

| | |
|---|---|
| *C08L 9/00* | (2006.01) |
| *C08K 3/06* | (2006.01) |
| *C08K 5/00* | (2006.01) |
| *C09K 3/00* | (2006.01) |
| *C08L 21/00* | (2006.01) |
| *C08L 45/00* | (2006.01) |
| *C08L 47/00* | (2006.01) |
| *G10K 11/16* | (2006.01) |
| *G10K 11/162* | (2006.01) |
| *C08J 9/00* | (2006.01) |
| *C08J 9/10* | (2006.01) |

(52) U.S. Cl.
CPC .............. *C08L 9/00* (2013.01); *C08J 9/0061* (2013.01); *C08J 9/103* (2013.01); *C08J 9/106* (2013.01); *C08K 3/06* (2013.01); *C08K 5/00* (2013.01); *C08L 21/00* (2013.01); *C08L 45/00* (2013.01); *C08L 47/00* (2013.01); *C09K 3/00* (2013.01); *G10K 11/16* (2013.01); *G10K 11/162* (2013.01); *C08J 2203/04* (2013.01); *C08J 2203/18* (2013.01); *C08J 2309/00* (2013.01); *C08J 2409/00* (2013.01); *C08J 2409/06* (2013.01); *C08J 2465/00* (2013.01); *C08L 2203/14* (2013.01); *C08L 2205/035* (2013.01)

(58) Field of Classification Search
CPC .... C08K 3/06; C08K 5/00; C09K 3/00; C08L 9/00; C08L 21/00; C08L 45/00; C08L 47/00; C08L 2205/035; C08L 2203/13; C10K 11/16; C10K 11/162; C08J 9/106; C08J 9/0061; C08J 2203/04; C08J 2465/00; C08J 2409/06; C08J 2409/00; C08J 2203/18
See application file for complete search history.

(56) References Cited

U.S. PATENT DOCUMENTS

| | | | |
|---|---|---|---|
| 5,760,135 A * | 6/1998 | Korpnnan et al. ..... | C09J 109/00 525/95 |
| 5,994,422 A | 11/1999 | Born et al. | |
| 7,902,298 B2 | 3/2011 | Kohlstrung et al. | |
| 7,960,474 B2 | 6/2011 | Rappmann et al. | |
| 8,137,500 B2 | 3/2012 | Sauer et al. | |
| 8,415,418 B2 | 4/2013 | Kohlstrung et al. | |
| 8,436,105 B2 | 5/2013 | Kohlstrung et al. | |
| 2001/0044503 A1 | 11/2001 | Born et al. | |
| 2004/0052951 A1 | 3/2004 | Sauer et al. | |
| 2004/0265560 A1 * | 12/2004 | Sauer et al. ............ | B32B 25/16 428/297.4 |

FOREIGN PATENT DOCUMENTS

| | | |
|---|---|---|
| CN | 103897226 A | 7/2014 |
| EP | 0657501 A1 | 6/1995 |
| EP | 0658597 A1 | 6/1995 |
| JP | 5140385 A | 6/1993 |
| JP | 10509755 A | 9/1998 |

(Continued)

OTHER PUBLICATIONS

International Search Report, PCT/JP2015/084766, dated Jan. 26, 2016. All references cited in the International Search Report are listed herein.

(Continued)

*Primary Examiner* — Nathan M Nutter
(74) *Attorney, Agent, or Firm* — Mary K. Cameron

(57) ABSTRACT

The present invention relates to a thermally curable composition comprising: (a1) a solid rubber in an amount of 2.5% by mass or more, (a2) an olefinic double bond-containing polymer which is liquid or pasty at 22° C. in an amount of less than 5% by mass, (a3) a hydrocarbon resin in an amount of, in total with said component (a2), 5% by mass or more and 20% by mass or less, and (a4) a liquid polydiene in an amount of 15% by mass or more based on the total mass of the composition as a component (a); and at least one selected from the group consisting of the following (b1) to (b3): (b1) sulfur and one or more accelerator(s), (b2) peroxidic vulcanization system or disulfidic vulcanization system, and (b3) quinones, quinone dioximes or dinitrosobenzene, as a vulcanization system (b).

15 Claims, 3 Drawing Sheets

(56) References Cited

FOREIGN PATENT DOCUMENTS

| | | | |
|---|---|---|---|
| JP | 2000212334 | A | 8/2000 |
| JP | 2004525999 | A | 8/2004 |
| JP | 2008528713 | A | 7/2008 |
| JP | 2009531480 | A | 9/2009 |
| JP | 2009532537 | A | 9/2009 |
| JP | 201060132 | A | 3/2010 |
| JP | 2010144142 | A | 7/2010 |
| JP | 2012529545 | A | 11/2012 |
| JP | 2013502471 | A | 1/2013 |
| WO | 2007039308 | A1 | 4/2007 |
| WO | 2007039309 | A1 | 4/2007 |
| WO | 2009036784 | A1 | 3/2009 |
| WO | 2010142563 | A1 | 12/2010 |

OTHER PUBLICATIONS

Supplementary EP Search Report for EP 15866855 dated Jul. 16, 2018.

\* cited by examiner

DAMPING-IMPARTING COMPOSITION HAVING HIGH IMPACT DURABILITY AT LOW TEMPERATURE

TECHNICAL FIELD

The present invention relates to a thermally curable composition and, more specifically, to a thermally curable resin that provides a cured product with excellent damping properties and low-temperature impact durability, and to a cured product thereof. The present invention also relates to a method for applying the thermally curable composition, and methods for preparing the thermally curable composition and a cured product thereof.

BACKGROUND ART

In contemporary vehicle structures (passenger cars, buses, trains, etc.), acoustic damping compounds with damping/soundproofing functions are provided in various components of the vehicle structures, such as accessories, panels, roofing, and flooring, to reduce or prevent transmission of vibrations generated by the structures and noise created by these vibrations. Common acoustic damping compounds include injectable and extrudable compounds based on bitumen, rubber, epoxy, and water-based (acrylate) dispersions whose matrix conforms to the shape of the vehicle. These acoustic damping compounds are usually applied to the surface of the vehicle frame and various application sites in the vehicle.

In order to prevent vibrations of the outer panels, prevent knocking of various components in the vehicle, and ensure the proper distance between components in a vehicle structure, a so-called undercoating is preferably applied between the outer panels and the roof arch, and between protective components and reinforcing components. This undercoating can reinforce the vehicle structure and the undercoating material can simultaneously function as an adhesive or sealant.

A composition integrating damping/soundproofing functions with the functions of an undercoating is the thermally curable composition disclosed in Patent Document 1, which comprises (a) an olefinic double-bond-containing polymer or copolymer based on a diene- and/or aromatic-substituted olefin and (b) a vulcanization system. When a composition described in Patent Document 1 is used, it serves as an integrated acoustic damping compound and undercoating, which previously required applying a plurality of different materials. This simplifies the manufacturing process and manufacturing equipment, and thus reduces costs. Because this composition is "pumpable" that is, can be distributed (pumped) by a pump, it can be applied by a robot and used advantageously in a vehicle production process which is highly automated.

However, compositions used in vehicle structures such those of automobiles will presumably be used in low-temperature environments and must have good low-temperature characteristics. A composition (one-part bonding agent, sealant, or coating) suitable for use in vehicle production having high tensile shear strength and high impact peel strength at low temperatures was disclosed in Patent Document 2 in the form of a high-temperature thermally curable reaction composition based on a natural and/or synthetic olefinic double-bond containing elastomer and a vulcanizer and containing a liquid polyene and polybutadiene.

PRIOR ART DOCUMENTS

Patent Documents

Patent Document 1: JP 2012-529545 A
Patent Document 2: JP 2009-532537 A

SUMMARY OF THE INVENTION

Problem to Be Solved by the Invention

A cured product obtained from a thermally curable composition described in Patent Document 1 has damping performance at normal temperatures that provides vibration damping (for example, vibration damping in vehicle frames such as those of automobiles), but are not very flexible at low temperatures. As a result, the bonding agent is sometimes destroyed by impacts under low-temperature conditions. The high-temperature thermally curable reaction composition described in Patent Document 2 has high tensile shear strength and high impact peel strength at low temperatures but does not provide effective damping performance. Therefore, it is very difficult to obtain a composition which combines damping properties with impact durability at low temperatures.

Therefore, it is an object of the present invention to provide a composition having excellent damping properties and excellent impact resistance at low temperatures.

Means for Solving the Problem

An aspect of the present invention relates to a thermally curable composition comprising:
- (a1) 2.5% by mass or more of a solid rubber,
- (a2) less than 5% by mass of a olefinic double bond-containing polymer that is liquid or pasty at 22° C.,
- (a3) from 5 to 20% by mass in total with (a2) of a hydrocarbon resin, and
- (a4) 15% by mass or more of a liquid polydiene relative to the overall mass of the composition and at least one type selected from a group including (b-1) through (b-3) below serving as a vulcanization system (b):
- (b1) sulfur and one or more accelerator,
- (b2) a peroxidic vulcanization system or disulfidic vulcanization system, and
- (b3) quinone, quinone dioxime, or dinitrosobenzene.

Effect of the Invention

The present invention is able to provide a composition having excellent damping properties and excellent impact resistance at low temperatures.

EMBODIMENT OF THE INVENTION

Figure 1A:
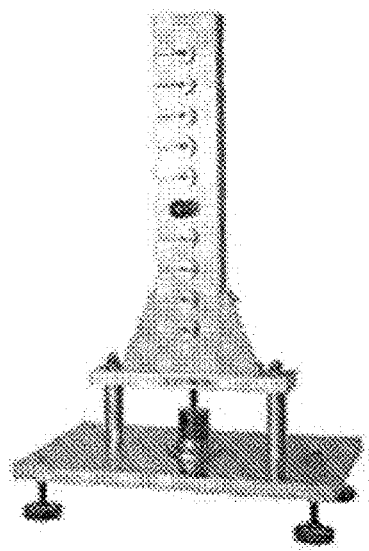
FIGS. 1A, 1B, 1C and 1D are a set of diagrams summarizing the low-temperature impact test performed on the examples, where 1 represents an SPCC steel plate for cross tensile test; 2 represents an SPCC steel plate for cross tensile test; 3 represents a weight; 4 represents a push rod; 5 represents an upper block; 6 represents a spacer; 7 represents a lower block; and 8 represents a cured product.

When the present inventors blended together a solid rubber, acoustic damping resin, hydrocarbon resin, and liquid polydiene at a certain ratio into a composition, they were able to obtain a cured product which had damping properties in a wide temperature range including that of low-temperature regions and impact durability at low temperatures. The present invention is a product of this discovery.

A cured product having damping properties means the cured product has intrinsic acoustic damping properties (vibration damping properties) and, more specifically, means the cured product has dissipating vibration damping properties in which mechanical vibration energy is converted into heat. A cured product having these damping properties causes a rapid decay in the initial amplitude of vibrations. Note that the damping properties of a cured product can be evaluated by measuring vibration damping behavior using dynamic mechanical analysis (DMA) as described later.

The following is a detailed explanation of the thermally curable composition of the present invention, a cured product thereof, and uses and a manufacturing method therefor.

In the description of compositions in the present specification, amounts described as percentages refer to mass percentages relative to the overall mass of the composition unless otherwise indicated.

In the present specification, the average molecular weights refer to mass average molecular weights of polymers unless otherwise indicated. More specifically, the average molecular weight is determined by calculating the molecular weight using gel permeation chromatography (GPC) and a calibration curve (a) Component (a1) Solid Rubber The solid rubber (including thermoplastic polymers having the elasticity of an elastomer at room temperature (22° C.)) (a1) can be, for example, a polybutadiene-based solid rubber, styrene butadiene rubber (styrene/butadiene/styrene copolymer (SBS)), butadiene/acrylonitrile rubber, styrene/isoprene rubber (styrene/isoprene/styrene copolymer (SIS)), styrene-ethylene/propylene-styrene copolymer (SEPS), styrene-ethylene/ethylene/propylene-styrene copolymer (SEEPS), synthetic or natural isoprene rubbers, polycyclooctenamer, butyl rubber, or polyurethane rubber. Use of any of these is preferred.

There are no particular restrictions on the molecular weight of the solid rubber as long as it has the elasticity of an elastomer at room temperature (22° C.). For example, there are no particular restrictions on the Mooney viscosity ($ML_{1+4}$ (100° C.)), which can be from 20 to 60, and preferably from 30 to 50. The Mooney viscosity can be measured in accordance with JIS K 6300.

A "polybutadiene-based solid rubber" can be a butadiene homopolymer or a copolymer containing a small amount (for example 10 mol. % or less) of a monomer unit other than a butadiene monomer (1,3-butadiene). Examples of monomer units other than a butadiene monomer include conjugated dienes such as isoprene, 1,3-pentadiene, 2-ethyl-1,3-butadiene, 4-methylpentadiene, and 2,4-hexadiene; non-cyclic monoolefins such as ethylene, propylene, butene, and pentene; cyclic monoolefins such as cyclopentene, cyclohexene, and norbornene; and non-conjugated diolefins such as dicyclopentadiene and 1,5-hexadiene. The polybutadiene-based solid rubber preferably has a high cis content. The cis-1,4-double bond content is preferably 80% or higher and more preferably 85% or higher.

In the present invention, the solid rubber (a1) content is preferably 2.0% by mass or higher and more preferably 2.5% by mass or higher relative to the overall mass of the composition. When the solid rubber content is 2.5% by mass or higher, the impact durability of the cured product at low temperature can be further improved. In addition, the solid rubber content is preferably 8% by mass or lower and more preferably 4% by mass or lower. When the solid rubber content is 8% by mass or lower, the damping properties of the cured product can be better maintained.

(a2) Olefinic Double Bond-Containing Polymer (Acoustic Damping Resin)

In the present invention, the olefinic double bond-containing polymer (a2) imparts acoustic damping properties to the cured product.

The olefinic double bond-containing polymer (a2) is preferably liquid or pasty at room temperature (22° C.) and a glass transition temperature that is not far below room temperature. More specifically, the glass transition temperature is preferably from −30° C. to 20° C. and more preferably from −20° C. to 15° C. Here, "liquid" means it can flow from the container under the influence of gravity and "paste" means it can be spread out into a uniformly smooth layer. The glass transition temperature is a value measured using differential scanning calorimetry (DSC) in accordance with JIS K 6240. The polymer may be a homopolymer or a copolymer.

The olefinic double bond-containing polymer (a2) is preferably a polymer of a diene- and/or aromatic-substituted olefin and more preferably a copolymer of styrene and diene from the standpoint of improved damping properties for the cured product. The diene can be selected from among butadienes, isoprenes, and combinations thereof. The styrene content of the styrene and diene copolymer is preferably 10% by mass or higher and more preferably 15% by mass or higher, and preferably 60% by mass or less and more preferably 50% by mass or less. When the styrene content is within this range, excellent dissipating vibration damping properties (that is, properties converting mechanical vibration energy into heat) can be obtained.

Note that "copolymer" means any polymer consisting of two or more different monomers. Therefore, the arrangement of the comonomers in the copolymer is optional. The copolymer may be a block copolymer or a random copolymer, but a random copolymer is preferred from the standpoint of imparting damping properties.

Therefore, in one embodiment of the present invention, the olefinic double bond-containing polymer (a2) is preferably a block polymer of styrene and diene.

Also, in another embodiment of the present invention, the olefinic double bond-containing polymer (a2) is preferably a random polymer of styrene and diene.

The diene component may be unsubstituted or have a substituent. Examples of substituents include a carboxyl group, a hydroxy group, and an amino group. The presence of a substituent can improve the adhesive properties of the composition to metal base materials.

There are no particular restrictions on the position of the olefinic double bond formed in the polymer chain by diene polymerization. From the standpoint of vulcanization properties and acoustic damping behavior, the olefinic double bond-containing polymer (a2) preferably includes an unsaturated diene fraction and the percentage of the vinyl fraction in the diene fraction (that is, the percentage of 1,2-vinyl bonds among the olefinic double bonds) is preferably 20 mol. % or higher and more preferably 40 mol. % or higher, and preferably 90 mol. % or less and more preferably 80 mol. % or less.

In other words, in another embodiment, the olefinic double bond-containing polymer (a2) includes an unsaturated diene fraction and the percentage of the vinyl fraction in the diene fraction (that is, the percentage of 1,2-vinyl bonds among the olefinic double bonds) is preferably 20 mol. % or higher and more preferably 40 mol. % or higher, and preferably 90 mol. % or less and more preferably 80 mol. % or less.

In addition to the structural composition of the polymer, the molecular weight of the polymer is also important. Specifically, the mass average molecular weight of the olefinic double bond-containing polymer (a2) is 1,000 or higher, preferably 2,000 or higher, and more preferably 5,000 or higher, and 50,000 or less, preferably 35,000 or less, and more preferably 25,000 or less. Even more preferably, the mass average molecular weight is from 5,000 to 18,000.

The amount of olefinic double bond-containing polymer (a2) relative to the overall weight of the composition is less than 5% by mass and preferably 4.5% by mass or less. When a solid rubber, hydrocarbon resin, and liquid polydiene are blended at the proper percentages with 5% by mass or less of the olefinic double bond-containing polymer, the impact durability at low temperatures can be improved while maintaining the damping properties of the cured product. In order to obtain sufficient damping performance, 1.0% by mass or higher is preferred and 3.0% by mass or higher is preferred.

(a3) Hydrocarbon Resin

The hydrocarbon resin (a3) contributes to the glass transition temperature of the cured product being in the desired −30° C. to 40° C. range. As a result, a cured product has excellent acoustic damping properties in a wide temperature range including that of low-temperature regions and excellent acoustic damping properties at normal ambient temperatures.

The hydrocarbon resin can be entirely aliphatic, entirely aromatic, or have both an aliphatic structure and an aromatic structure. It may also be an aliphatic hydrocarbon resin that is aromatically embellished. In all cases, a hydrocarbon resin which is compatible with other polymer components is preferred.

Examples of hydrocarbon resins include natural hydrocarbon resins such as terpene resins (terpene resins, hydrogenated terpene resins, aromatically modified terpene resins, etc.) and rosin-based resins (rosins and modified rosins such as hydrogenated rosins, disproportionated rosins, and polymerized rosins), and synthetic hydrocarbon resins such as petroleum hydrocarbon resins, coumarone/indene resins, xylene resins, and styrene resins. Among these, petroleum hydrocarbon resins are preferred.

The petroleum hydrocarbon resin is preferably a petroleum hydrocarbon resin in which the fractions containing unsaturated hydrocarbon monomer byproducts of the thermal cracking, for example, of petroleum naphtha have been polymerized. Specific examples include C5 aliphatic petroleum resins, C9 aromatic petroleum resins, C5/C9 petroleum resins, hydrogenated petroleum resins in which C9 or C5/C9 petroleum resins have been hydrogenated, and alicyclic petroleum resins such as dicyclopentadiene petroleum resins.

Examples of commercial products that can be used advantageously as the hydrocarbon resin include Escorez (trademark) 1102, Escorez (trademark) 2173, Escorez (trademark) 2184, Escorez (trademark) 2101, Escorez (trademark) 2105, Novares (trademark) TK, Novares (trademark) TV, Novares (trademark) TA, Novares (trademark) TP, Novares (trademark) TR, Novares (trademark) TS, Nova (trademark) TW and Nevtac (trademark) 10.

When a resin compatible with other polymer components and having a softening point exceeding 10° C. (>10° C.), preferably exceeding 40° C. (>40° C.), and more preferably exceeding 70° C. (>70° C.) is blended as the hydrocarbon resin (a3) in the composition, the glass transition temperature of the cured product can be adjusted to within the −30° C. to 40° C. range and the maximum value of the loss factor (tanδ) can be increased. There are no particular restrictions on the softening point of the hydrocarbon resin, but a softening point of 140° C. or less is preferred. Here, the softening point is a value measured in accordance with JIS K 2207.

The hydrocarbon resin (a3) is preferably blended in a range from 5 to 20% by mass in total with the olefinic double bond-containing polymer (a2). When the total amount of olefinic double bond-containing polymer and hydrocarbon resin is within this range, good damping properties are imparted to the cured product and impact durability at low temperatures is improved. The amount of hydrocarbon resin relative to the total mass of the composition is preferably 0.1% by mass or higher, more preferably 1% by mass or higher, and even more preferably 5% by mass or higher while also being 19% by mass or less, preferably 15% by mass or less.

(a4) Liquid Rubber

The liquid rubber (a4) is preferably a polydiene that is a liquid at room temperature (22° C.).

Examples of diene monomers for the liquid polydiene include butadienes, isoprenes, and chloroprenes. The polydiene can be a homopolymer, copolymer, or hydrogenate of these. Among these polydienes, polybutadiene and polyisoprene are preferred and polybutadiene is especially preferred.

A liquid rubber having a main chain and/or side chain functional group is also effective. Examples of functional groups include a carboxyl group, a hydroxyl group, and an amine group. Two or more types of functional groups are also possible. A carboxyl group is preferred from the standpoint of adhesiveness to the base material. A functional group may be present in the main chain and/or side chain, but its presence on the end of the chain is preferred.

The mass average molecular weight of the liquid polydiene compound is preferably from 500 to 50,000, and more preferably from 1,000 to 10,000.

The amount of liquid rubber (a4) relative to the overall mass of the composition is preferably 10% by mass or higher and more preferably 15% by mass or higher. When 15% by mass or more liquid rubber is included, even better low-temperature impact durability can be imparted to the cured product. The liquid rubber content is preferably 30% by mass or less, more preferably 25% by mass or less, and even more preferably 20% by mass or less.

(b) Vulcanization System

The composition of the present invention also includes a vulcanization system (b). The vulcanization system is any one commonly used to vulcanize rubber. The following is a list of examples.

(b1) Sulfur and One or More Accelerator
(b2) Peroxidic Vulcanization System or Disulfidic Vulcanization System
(b3) Quinones, Quinone Dioximes, or Dinitrosobenzene The vulcanization systems listed in (b1) through (b3) above can be used alone or in combinations of two or more.

(b1) Sulfur and One or More Accelerator

The sulfur used as the vulcanizing agent is preferably powdered sulfur. There are no particular restrictions on the amount of sulfur used. This may be selected on the basis of the presence or absence of an accelerator and/or additional vulcanizing agent. However, generally the amount of sulfur relative to the total mass of the composition is from 0.01% by mass to 6.5% by mass, and preferably from 0.05% by mass to 4% by mass. In one embodiment, the amount is preferably from 0.05% by mass to 1% by mass and more preferably from 0.1% by mass to 0.5% by mass. When the amount of sulfur is 1% by mass or less, the low-temperature flexibility and low-temperature damping properties of the cured product are sometimes improved.

The accelerator can be any suitable organic accelerator, such as dithiocarbamate (in the form of an ammonium salt or metal salt), xanthogenate, thiuram compounds (monosulfides and disulfides), thiazole compound, aldehyde/amine promoters (such as hexamethylenetetramine), and guanidine accelerators. Preferred examples include dibenzothiazyl disulfide (MBTS), 2-mercaptobenzothiazole (MBT) or a zinc salt thereof (ZMBT), zinc dibenzyldithiocarbamate (ZBEC), N-cyclohexyl benzodithiozylsulfenamide (CBS), and diphenyl guanidine. The amount of accelerator used in total with a zinc compound described below, when a zinc compound is used, relative to the total mass of the composition is preferably from 0.25% by mass to 20% by mass and more preferably from 0.8% by mass to 12% by mass. In order to achieve the high thermal stability and rebound strength of an adhesive, the vulcanization mixture can contain a bifunctional crosslinking agent. Specific examples include crosslinking agents based on a bifunctional dithiocarbamate, such as 1,6-bis (N,N-dibenzyl thiocarbamoyldithio) hexane. The amount of crosslinking agent relative to the total weight of the composition is from 0 to 2 wt. % and preferably from 0 to 1 wt. %.

A zinc compound can also be used as the accelerator. The zinc compound acting as an accelerator can be selected from among zinc salts of fatty acids, zinc dithiocarbamate, basic zinc carbonate, and very finely powdered zinc oxide. The amount of zinc compound relative to the total weight of the composition is preferably from 0.5 to 10 wt. % and more preferably from 2 to 8 wt. %. These zinc compounds can be combined with any of the accelerators mentioned above, and combined use is preferred. Any commonly used rubber vulcanization aid, for example, fatty acids (such as stearic acid), can be included in the composition.

(b2) Peroxidic Vulcanization System or Disulfidic Vulcanization System

Any organic peroxide commonly added to vulcanization systems can be used as the peroxidic vulcanization system. Examples include crosslinking agents such as dibenzoyl peroxide, tert-butyl peroxybenzoate, especially 1,1-di-(tert-butylperoxy) 3,3,5-trimethylcyclohexane, butyl-4,4-di-(tert-butylperoxy) valeric acid, dicumyl peroxide, di-(2-tert-butylperoxyisopropyl) benzene, tert-butyl cumyl peroxide 2,5-dimethyl-2,5-di-(tert-butylperoxy) hexane, di-tert-butyl peroxide, 2,5-dimethyl-2,5-di-(tert-butylperoxy) hex-3-yne, and triallyl isocyanurate. The amount of peroxidic vulcanization system added relative to the total mass of the composition can be from 0.3 to 4.5% by mass. Instead of a peroxidic vulcanization system, a disulfidic vulcanization system can be used. A preferred example is thiuram disulfide. The amount of disulfidic vulcanization system added relative to the total mass of the composition can be from 0.2 to 5% by mass.

(b3) Other Vulcanizing Agents

Other vulcanization systems that can be used include quinone, quinone dioxime (especially p-benzoquinone dioxime), nitrosobenzene, and dinitrosobenzene (especially p-dinitrosobenzene). These are all well-known vulcanization systems for rubber. These vulcanization systems can be combined with other vulcanization systems, for example, a mixed vulcanization system consisting of elemental sulfur, an organic accelerator, and a quinone dioxime can be used. Here, an example of a quinone dioxime is p-benzoquinone dioxime. Another quinone dioxime may be used in combination with any other vulcanization system mentioned above. The vulcanization system may also consist of quinone dioxime only.

The amount of quinone, quinone dioxime, or dinitrosobenzene added depends on the combination with other vulcanization systems, but relative to the total mass of the composition, use of 0.01 to 5% by mass is preferred and from 0.1 to 2% by mass is especially preferred.

In an embodiment of the present invention, the essential components described above may be combined with a filler, moisture absorbent, blowing agent, and/or plasticizer listed below.

(c) Filler

In a preferred embodiment, the composition of the present invention can include a filler (c). The amount of filler relative to the total mass of the composition is preferably from 10 to 45% by mass, more preferably from 15 to 40% by mass, and even more preferably from 25 to 36% by mass.

The filler can be selected from a wide variety of materials. Examples include chalk, natural or ground calcium carbonate, calcium magnesium carbonate, silica, talc, mica, baryte, and carbon black. In an embodiment, at least some of the filler is preferably surface-treated. For example, the filler is preferably coated with stearic acid to reduce the amount of moisture incorporated into the cured product and reduce the moisture sensitivity of the cured product. Examples include calcium carbonated and chalk coated with stearic acid. In one embodiment, use of a filler with a high aspect ratio is preferred, for example, a flaky filler whose thickness is small relative to the size of the flake surface. Flaky fillers are fillers with an aspect ratio of 10 or more (such as one whose thickness perpendicular to the flake surface is one-tenth the minimum surface area of the flake surface). Layered silicates (preferably mica and talc) and graphite are advantageous from the standpoint of imparting good acoustic damping properties. An inorganic lightweight aggregate (such as glass balloons and ceramic balloons) can be used to adjust the specific gravity.

(Moisture Absorbent)

In order to bind moisture, a composition of the present invention can include in addition to a filler from 0 to 8 wt. % and preferably from 1 to 6 wt. % calcium oxide relative to the total weight of the composition.

(d) Blowing Agent

In an embodiment, the composition of the present invention is preferably designed to irreversibly expand (foam) before or during thermally curable. By irreversibly increasing the volume of the cured product via irreversible expansion, the spaces and crannies in structures can be completely filled by the cured product. For this purpose, a composition of the present invention preferably includes a blowing agent (d).

Any blowing agent common in the art can be used. Examples include chemical blowing agents which release gas when they decompose and physical blowing agents such as expandable hollow beads. Examples of chemical blowing agents include azobisisobutyronitrile, azodicarbonamide, dinitrosopentamethylenetetramine, 4,4'-oxybis (benzenesulfonic acid hydrazide), diphenylsulfone-3,3'-disulfohydrazide, benzene-1,3-disulfohydrazide, and p-toluenesulfonyl semicarbazide. Expandable hollow plastic microspheres based on polyvinylidene chloride copolymer or acrylonitrile/(meth) acrylate copolymer are especially preferred. Examples are available from Pierce & Stevens and Casco Nobel under the "Dualite" (registered trademark) and "Expancel" (registered trademark) names.

Use of a blowing agent can be determined based on the intended use of the composition. For example, a blowing agent is preferably added within the appropriate range when the composition is to be used in a vehicle to foam and resist outer panel strain during bake hardening.

The amount of blowing agent required to obtain the desired expansion coefficient can be determined by those skilled in the art based on the type of blowing agent used. For example, the amount added relative to the total mass of the composition may be from 0.2% by mass to 6% by mass, preferably 4% by mass or less.

(e) Plasticizer

A composition of the present invention can include a plasticizer (e). By including a plasticizer, the workability of the composition and the mechanical properties of the curing product can be improved.

There are no particular restrictions on the amount of plasticizer that is used, but generally the amount used relative to the total mass of the composition is 40% by mass or less, preferably 30% by mass or less, and more preferably 25% by mass or less, as well as 2% by mass or more, and preferably 5% by mass or more.

Examples of plasticizers include phthalate esters and hydrocarbon oils such as natural oils that are liquid at 22° C. (including fatty acid glycerin esters such as triglycerides of rapeseed oil, soybean oil, walnut oil, linseed oil, sunflower oil, and olive oil).

When a plasticizer and a hydrocarbon resin (a3) are included in the composition, the acoustic damping properties in the −20° C. to 40° C. temperature range can be further improved.

A composition of the present invention can include reinforced fibers, preferably reinforced aramid fibers, carbon fibers, glass fibers, polyamide fibers, polyurethane fibers, or polyester fibers. These fibers are preferably short fibers in the form of pulp fibers or staple fibers. These fibers preferably have an average fiber length from 100 to 250 μm and a diameter from 5 to 20 μm. Here, the longest fiber length is preferably from 1,000 to 2,000 μm. Use of glass fibers, aramid fiber-based polyaramid fibers, or polyester fibers is especially preferred. The amount of fibers relative to the total mass of the composition is preferably from 0.5 to 10% by mass.

In addition to component (a) and vulcanization system (b), a composition of the present invention preferably includes at least one type selected from among a filler (c), blowing agent (d), and plasticizer (e), and more preferably a filler (c), blowing agent (d), and plasticizer (e).

The following are preferred embodiments of compositions of the present invention. The present invention is not limited to these embodiments.

TABLE 1

| Component | Amount (Embodiment) | (Preferred Embodiment) |
|---|---|---|
| (a) Resin Component | | |
| (a1) Solid Rubber | 2 to 8 | 2.5 to 4 |
| (a2) Acoustic Damping Resin | 1 to less than 5 | 3 to 4.5 |
| (a3) Hydrocarbon Resin | 1 to 19 | 5 to 15 |
| (a4) Liquid Polydiene | 10 to 30 | 15 to 20 |
| (b1) Vulcanization System | | |
| Sulfur | 0.05 to 1 | 0.1 to 0.5 |
| Vulcanization Accelerator (MBTS, MBT, ZMBT, ZBEC, CBS, etc.) | 0.25 to 20 | 0.8 to 12 |
| Zinc Oxide | 0 to 8 | 0.5 to 7 |
| (c) Filler | | |
| Calcium Carbonate, Graphite, Talc, Mica, Ceramic Balloons, Silica, and Other Silicic Acid Fillers | 15 to 40 | 25 to 36 |
| Carbon Black | 0.1 to 3 | 0.3 to 2 |
| Coated Calcium Carbonate | 0 to 18 | 0 to 12 |
| Calcium Oxide (Moisture Absorbent) | 1 to 6 | 1.5 to 5.5 |
| (d) Blowing Agent | | |
| Chemical Blowing Agent (Containing Active Agent) | 0 to 4 | 0.2 to 3 |
| Physical Blowing Agent | 0 to 4 | 0 to 1.5 |
| Antioxidant | 0.1 to 1.0 | 0.2 to 0.7 |
| (e) Plasticizer | 2 to 30 | 5 to 25 |

(The amounts are denoted as mass percentages relative to the overall mass of the composition.)

Compositions of the present invention are not limited to the compositions listed in Table 1. The amounts of each component can be changed and other additives may be included in addition to or instead of components listed above, such as fibers, other common vulcanization accelerators and/or crosslinking agents, other antioxidants, co-activators, catalysts, other blowing agents, oils, resins, anti-aging agents, rheology aids, adhesion promoters, pigments, and thermoplastic polymers.

A composition of the present invention can be prepared by introducing and mixing together the components in a mixer such as a bead mill, a grinder, a pot mill, a three-roll mill, a rotary mixer, or a twin screw mixer.

A composition of the present invention is a mixture of a plurality of components that are in liquid or solid form at 22° C., and the mixing ratio of each component can be adjusted within a range that does not impair the effects of the present invention. Therefore, in an embodiment of the present invention the percentages of each component can be adjusted so that the composition can be applied manually or mechanically (for example, by a robot) at a temperature under 60° C. using a standard applicator for adhesives and sealants in the automotive industry. As a result, it is important for the acoustic damping resin to be in liquid or paste form at 22° C., and for the solid rubber, acoustic damping resin, hydrocarbon resin, and liquid rubber to be mixed at the desired percentages as described above. Therefore, in a preferred embodiment of the present invention, the viscosity of the composition in the temperature range from 15 to 60° C. preferably allows the composition to be pumped by a pump (rotating pump, gear pump, or piston pump). The present invention is advantageous in that it does not require any particular extrusion technology or preparation of a pre-molded product.

Another aspect of the present invention relates to the application of a composition of the present invention. Specifically, the present invention relates to a method for applying a composition of the present invention, the method comprising injecting the composition at an application site via a pump (for example, one of the pumps mentioned above) at a temperature from 15 to 60° C. to apply the composition on top of a lubricated base material, untreated base material, or a cleaned base material in liquid or paste form.

After application, the composition of the present invention can be set thermally in an oven commonly used in the automobile or equipment construction industry for baked paint coatings. The temperature used to perform the thermally curable and, if necessary, initiate foaming is preferably from 160 to 215° C. This temperature is preferably maintained for 10 to 60 minutes.

A composition of the present invention can be used not only in pump applications, but also as a bake-fired molded product in a trim shop (outfitting) or a retrofitted product in the aftermarket (repair market).

Another aspect of the present invention relates to a cured product (thermoset product) obtained by curing a composition of the present invention. A cured product of the present invention has both excellent damping properties (acoustic damping properties) and low-temperature impact durability.

In the present embodiment, the glass transition temperature of the cured product is preferably from −30° C. to 40° C. and more preferably from −20° C. to 40° C. When the glass transition temperature is within this range, good damping properties (acoustic damping behavior) can be realized within a temperature range including low-temperature regions. The glass transition temperature of a cured product can be defined as the temperature with the greatest loss factor (tanδ).

In the present embodiment, the minimum value for the loss factor (tanδ; measurement frequency: 50 Hz) of the cured product in the −20° C. to 40° C. temperature range is 0.2 or higher. In a preferred embodiment, the loss factor (tanδ) of the cured product at −20° C. is preferably 0.5 or higher and more preferably 0.9 or higher. The loss factor (tanδ) of the cured product in low-temperature regions (−20° C. to 0° C.) is preferably 0.5 or higher. When the value for the loss factor (tanδ) is within this range, good acoustic damping properties can be realized in a wide temperature range including low-temperature regions.

In a preferred embodiment, the storage modulus (E'; measurement frequency: 20 Hz) of the cured product at −20° C. is preferably 1,000 MPa or less, more preferably 500 MPa or less, and even more preferably 100 MPa or less. When the storage modulus (E') is within this range, excellent impact durability in low-temperature environments can be realized.

In the present specification, the storage modulus (E') and the loss factor (tanδ) of the cured product are measured in the following manner using dynamic mechanical analysis (DMA) in accordance with JIS K 6394.

Measurement Sample: Cured product (cured at 170° C. for 20 minutes) Measuring Instrument: Device conforming to JIS K 6394 (such as DMS 6100 from SII (Seiko Instruments))
Measurement Mode: Compression
Measurement Temperature: −20° C. to 80° C.
Rising Temperature Rate: 2° C./min
Measurement Frequency: 0.1 to 100 Hz
Frequency for Measuring Loss Factor (tanδ) and Glass Transition Temperature: 50 Hz
Frequency for Measuring Storage Modulus (E'): 20 Hz A cured product of the present invention can be prepared by heating a composition of the present invention for 10 to 60 minutes in a temperature range from 160 to 215° C. Here, the composition may be applied directly to the usage site and cured or fired to form a retrofitted product. This can be molded using any method common in the art such as injection molding.

Another aspect of the present invention relates to uses for a composition or cured product of the present invention. A composition of the present invention can be used advantageously as an undercoating or adhesive/sealant in structural components (doors, engine compartment hoods, truck lids, roofs, fronts, and chassis), in the passenger compartment of vehicles (automobiles and buses), and in the manufacture of railway cars. A composition of the present invention can also be used advantageously in machinery construction to dampen acoustic vibrations generated by motors, gears, and pumps (for example, vibrations generated by rotating machinery). Therefore, the present invention relates to uses for a composition of the present invention as an acoustic damping material and undercoating in vehicle construction and machinery construction.

In addition to damping properties, a cured product of the present invention also has excellent impact durability at low temperatures. Therefore, a composition of the present invention can be used especially advantageously as an acoustic damping material and undercoating in structural components in vehicle construction (doors, roofs, hoods, etc.) which require impact durability when used on low-temperature environments.

EXAMPLES

The following is a more detailed explanation of the present invention with reference to examples. The present invention is not limited to these examples.

Components were mixed together at the percentages shown in Table 2 to obtain the compositions in Examples 1 through 4 and Comparative Examples 1 through 7. Comparative Example 8 is a generic mastic material (Teroson RB440 from Henkel Japan, Ltd.). These compositions were thermally cured to obtain cured products, and the dynamic viscoelasticity and low-temperature impact durability of each cured product was evaluated in the following manner.
Evaluation of Dynamic Viscoelasticity The following methods were used to measure the loss tangent (tanδ) and storage modulus (E') of the cured products.

1. A test composition was applied to a thickness of 4 to 8 mm on a steel plate with a diameter of 50 to 60 mm and cured for 20 minutes at 170° C.
2. The cured test sample was molded in a round mold with a diameter of 7 to 10 mm and a thickness of 4 to 8 mm.
3. The loss tangent (tanδ) and storage modulus (E') of the molded test sample were measured at the various measurement frequencies under the following conditions.

Figure 1B:
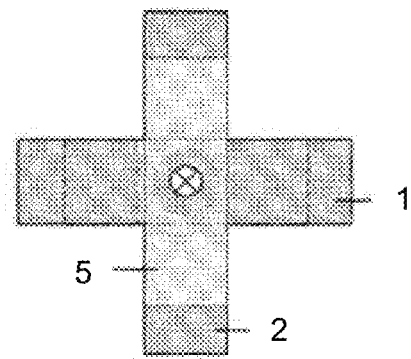
Figure 1C:
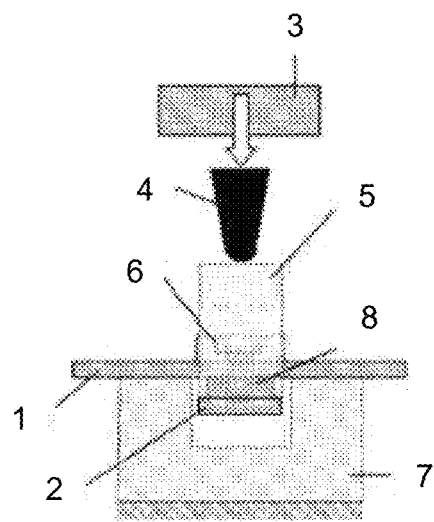
Figure 1D:
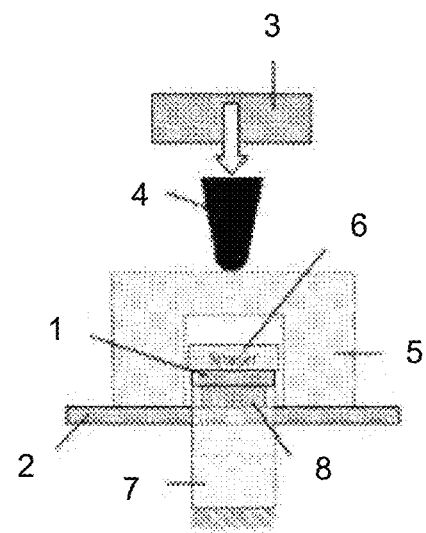
Figure 2:
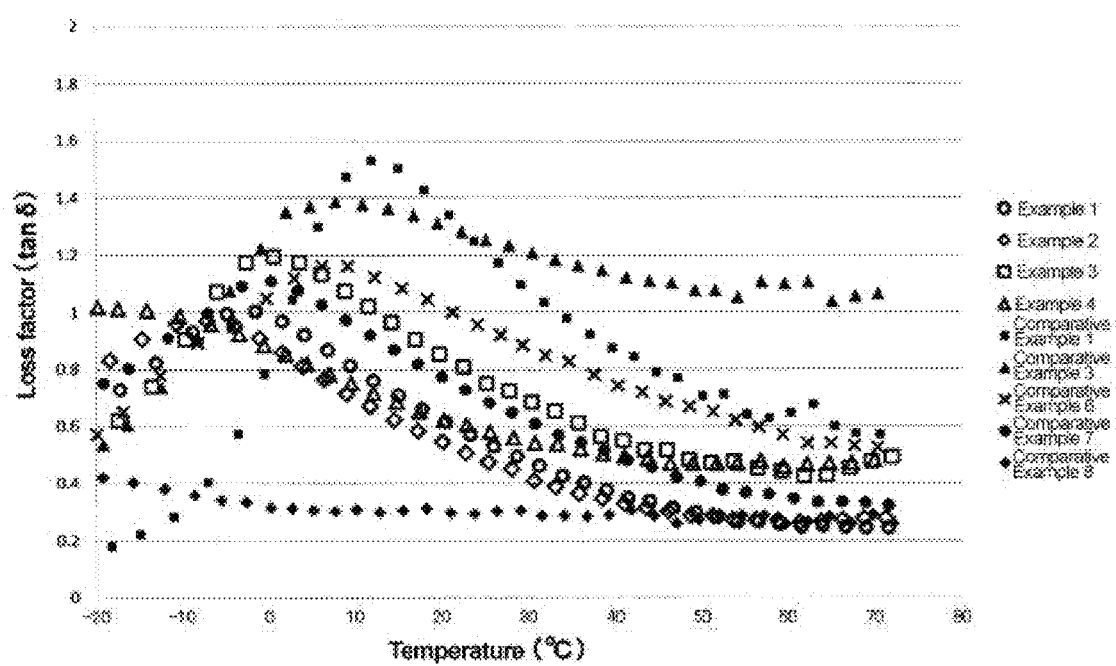
FIG. 2 is a graph showing the relationship between the loss factor (tanδ) and the temperature of the cured products in the examples.
Figure 3:
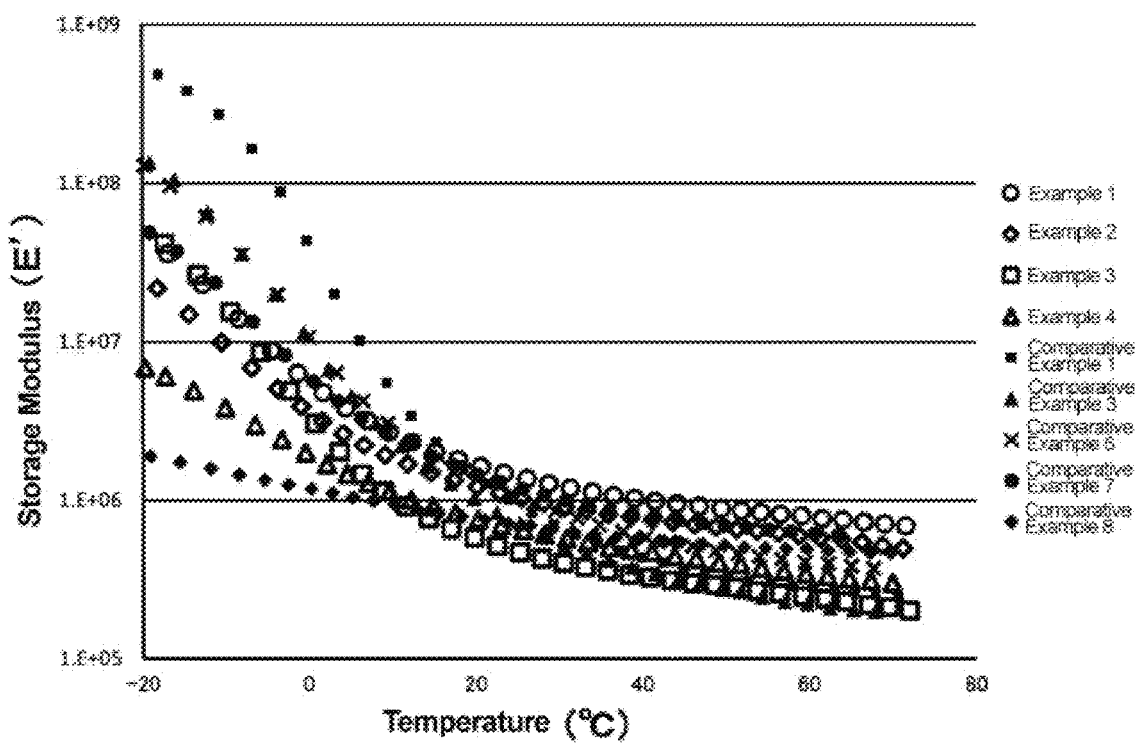
FIG. 3 is a graph showing the relationship between the storage modulus (E') and the temperature of the cured products in the examples.

(Measurement Conditions)
Measuring Instrument: DMS 6100 from SII (Seiko Instruments)
Measurement Mode: Compression
Measurement Temperature: −20° C. to 80° C.
Rising Temperature Rate: 2° C./min
Measurement Frequencies: 0.1, 1.0, 10, 20, 50, 100 Hz FIG. 2 shows the tanδ measurement results for each composition at a measurement frequency of 50 Hz and FIG. 3 shows the storage modulus (E') measurement results for each composition at a measurement frequency of 20 Hz.
Evaluation of Impact Durability at Low Temperatures
(1) Low-Temperature Impact Durability Test The impact resistance test is summarized in FIG. 1. FIG. 1A is an overall view of the measuring device, FIG. 1B is a top view, FIG. 10 is a front view, and FIG. 1D is a side view. In the measuring device shown in FIG. 1, a steel plate for a cross tensile test (1) is supported by a lower block (7). The impact load from the free fall of a weight (3) was applied to a plate (2) via a push rod (4) and an upper block (5), and acted as stress separating the steel plate for the cross tensile test (1) and the other plate (2).
(Test Sample)

The composition to be evaluated was applied between plate (1) and plate (2) (SPCC steel plates) laid on top of each other in the shape of a cross, and cured for 20 minutes at 170° C. to obtain a cross tension test sample. The thickness of the cured product (8) was approximately 3 mm.
(Testing Method)

1. The cross tension test sample was placed for 30 minutes or more in a low-temperature tank at −30° C.
2. The low-temperature tank was opened and the cross tension test sample was quickly placed on a testing instrument.
3. The door to the low-temperature tank was closed and the test sample was allowed to stand for 5 minutes.
4. A predetermined weight was dropped five times from a distance of 20 mm and the extent of cracking in the adhesive was observed.

The 20 mm drop distance is meant to simulate the impact load when a door is forcibly closed while the composition is being used as an automotive mastic material (assuming a displacement response to the impact load when the door is forcibly closed in the form of a sine wave (20 Hz) and the displacement (elongation) of current mastic materials, which is 5 mm).

The weight required to achieve displacement equivalent to generic mastic materials (Comparative Example 8) as an indicator of the impact load when a door is forcibly closed was approximately 1.3 kg.

(Measurement Results)

The weight freely dropped from 20 mm at a measurement temperature of −30° C. was changed successively from 0.3 kg to 3.0 kg. A sample failed the test (×) when the adhesive layer was either destroyed or became detached, and a sample passed the test (○) when the adhesive layer did not become destroyed or detached. The evaluation results of Examples 1 through 4 and Comparative Examples 1 through 8 are shown in Table 2.
(2) Actual Car Door Test The compositions in Example 4 and Comparative Example 1 were used as a mastic material in a test in which the door on an actual car was forcibly opened and closed.

When the door forcible opening and closing test was performed at −30° C., the cured composition in Comparative Example 1 was destroyed when the door was opened and closed once. When the door was opened and closed using the composition in Example 4, there was no peeling and the low-temperature impact resistance in an actual door was found to be good.

These results suggest that while Comparative Example 8 (general-purpose mastic material) has impact durability at low temperature (Table 2), the tanδ value over the entire temperature range was less than 0.5 (FIG. 2) suggesting low damping properties (acoustic damping properties). Also, the compositions in Comparative Example 1 through 7 had low impact durability at low temperature (Table 2), especially impact durability with respect to an impact corresponding to a door being forcibly opened and closed (1.3 kg in Table 2). However, the compositions in Examples 1 through 4 had excellent impact durability at low temperatures, especially impact durability with respect to an impact exceeding the impact load on a door being forcibly opened and closed (1.3 kg in Table 2). In addition, increases in the storage modulus in the low-temperature range were suppressed (FIG. 3) and flexibility was high compared to that of the comparative examples. Furthermore, the tanδ value remained at or above 0.5 even in the low-temperature range (−20° C.), suggesting superior damping properties (acoustic damping properties) in temperature ranges commonly found in low-temperature regions.

TABLE 2

| Component | Example 1 | Example 2 | Example 3 | Example 4 |
|---|---|---|---|---|
| (a1) Solid Rubber High cis-1,4-polybutadiene (Mooney Viscosity ($ML_{1+4}$ (100° C.)) | 2.8 | 3.2 | 2.8 | 3.2 |
| (a2) Acoustic Damping Polymer Polystyrene/polybutadiene random copolymer (Tg-6° C., Styrene Content 40 wt %, Mw 10000 g/mol.) | 4.8 | 4.8 | 4.8 | 4 |
| (a3) Hydrocarbon Resin Aromatic Hydrocarbon Resin (Softening Point 90° C.) | 10 | 10 | 10 | 10 |
| (a4) Liquid Polydiene Liquid high cis-1,4-polybutadiene (MW = 3000 g/mol.) | 20 | 20 | 20 | 20 |
| Plasticizer DINP (Diisononyl phthalate) | 15 | 15 | 15 | 15 |
| Sulfur Powder | 0.4 | 0.4 | 0.2 | 0.2 |
| Vulcanization Aid ZBEC (Zinc dibenzyldithiocarbamate) | 9 | 9 | 9 | 4 |
| Chemical Blowing Agent OBSH (4,4'-oxy(benzene-sulphonohydrazide)*1 ADCA (Azodicarbonamide)*2 | 0.6(*2) | 0.6(*1) | 0.6(*1) | 0.2(*1) |
| Zinc Oxide Powder | 1.1 | 1.1 | 1.1 | 2 |
| Antioxidant Poly (dicyclopentadiene-co-p-cresol) | 0.6 | 0.6 | 0.6 | 0.6 |
| Calcium Oxide Powder | 2 | 2 | 2 | 2 |

TABLE 2-continued

| Component | Example 1 | Example 2 | Example 3 | Example 4 |
|---|---|---|---|---|
| Carbon Black | 0.2 | 0.2 | 0.2 | 0.2 |
| Calcium Carbonate Powder/Silicic Acid-Based Filler (Silicic Acid-Based Filler: Approx. 12%) | 29.7 | 28.8 | 29.9 | 34.4 |
| Other | 3.6 | 4.1 | 3.6 | 4.2 |
| Low-Temperature Impact Resistance 0.3 kg | ○ | ○ | ○ | ○ |
| 0.5 kg | ○ | ○ | ○ | ○ |
| 0.8 kg | ○ | ○ | ○ | ○ |
| 1.0 kg | ○ | ○ | ○ | ○ |
| 1.3 kg | ○ | ○ | ○ | ○ |
| 1.8 kg | ○ | ○ | ○ | ○ |
| 3.0 kg | ○ | ○ | ○ | ○ |
| Actual Car Door Test (−30° C., 60 G) | ○ | No Data | ○ | ○ |

In the table, the amounts for each component are denoted as mass percentages relative to the overall mass of the composition.
Actual card door test: Actual car door forcibly opened and closed.

TABLE 3

| Component | C. Ex. 1 | C. Ex. 2 | C. Ex. 3 | C. Ex. 4 |
|---|---|---|---|---|
| (a1) Solid Rubber High cis-1,4-polybutadiene (Mooney Viscosity (ML$_{1+4}$ (100° C.)) | 1.6 | 3.2 | 1.6 | 1.6 |
| (a2) Acoustic Damping Polymer Polystyrene/polybutadiene random copolymer (Tg-6° C., Styrene Content 40 wt %, Mw 10000 g/mol.) | 5 | 5 | 5 | 10 |
| (a3) Hydrocarbon Resin Aromatic Hydrocarbon Resin (Softening Point 90° C.) | 19 | 19 | 10 | 10 |
| (a4) Liquid Polydiene Liquid high cis-1,4-polybutadiene (MW = 3000 g/mol.) | 6 | 6 | 20 | 20 |
| Plasticizer DINP (Diisononyl phthalate) | 24 | 24 | 15 | 15 |
| Sulfur Powder | 0.4 | 0.4 | 0.4 | 0.4 |
| Vulcanization Aid ZBEC (Zinc dibenzyldithiocarbamate) | 9 | 9 | 9 | 9 |
| Chemical Blowing Agent OBSH (4,4'-oxy(benzene-sulphonohydrazide)*[1] ADCA (Azodicarbonamide)*[2] | 0.6(*2) | 0.6(*2) | 0.6(*2) | 0.6(*2) |
| Zinc Oxide Powder | 1.1 | 1.1 | 1.1 | 1.1 |
| Antioxidant Poly (dicyclopentadiene-co-p-cresol) | 0.2 | 0.2 | 0.2 0.6 | 0.2 0.6 |
| Calcium Oxide Powder | 2 | 2 | 2 | 2 |
| Carbon Black | 0.2 | 0.2 | 0.2 | 0.2 |
| Calcium Carbonate Powder/Silicic Acid-Based Filler (Silicic Acid-Based Filler: Approx. 12%) | 29 | 25.4 | 32.4 | 27.4 |
| Other | 2.1 | 4.1 | 2.1 | 2.1 |
| Low-Temperature Impact Resistance 0.3 kg | X | ○ | ○ | ○ |
| 0.5 kg | X | X | ○ | X |
| 0.8 kg | X | X | X | X |
| 1.0 kg | X | X | X | X |
| 1.3 kg | X | X | X | X |
| 1.8 kg | X | X | X | X |
| 3.0 kg | X | X | X | X |
| Actual Car Door Test (−30° C., 60 G) | X | | No Data | |

In the table, the amounts for each component are denoted as mass percentages relative to the overall mass of the composition.
Actual card door test: Actual car door forcibly opened and closed.

TABLE 4

| Component | C. Ex. 5 | C. Ex. 6 | C. Ex. 7 | C. Ex. 8 |
|---|---|---|---|---|
| (a1) Solid Rubber High cis-1,4-polybutadiene (Mooney Viscosity (ML$_{1+4}$ (100° C.)) | 1.6 | 2 | 2.4 | General-Purpose Mastic Material |

TABLE 4-continued

| Component | C. Ex. 5 | C. Ex. 6 | C. Ex. 7 | C. Ex. 8 |
|---|---|---|---|---|
| (a2) Acoustic Damping Polymer Polystyrene/polybutadiene random copolymer (Tg-6° C., Styrene Content 40 wt %, Mw 10000 g/mol.) | 5 | 5 | 5 | |
| (a3) Hydrocarbon Resin Aromatic Hydrocarbon Resin (Softening Point 90° C.) | 19 | 10 | 10 | |
| (a4) Liquid Polydiene Liquid high cis-1,4-polybutadiene (MW = 3000 g/mol.) | 20 | 20 | 20 | |
| Plasticizer DINP (Diisononyl phthalate) | 24 | 15 | 15 | |
| Sulfur Powder | 0.4 | 0.4 | 0.4 | |
| Vulcanization Aid ZBEC (Zinc dibenzyldithiocarbamate) | 9 | 9 | 9 | |
| Chemical Blowing Agent OBSH (4,4'-oxy(benzene-sulphonohydrazide)*1 ADCA (Azodicarbonamide)*2 | 0.6(*2) | 0.6(*2) | 0.6(*2) | |
| Zinc Oxide Powder | 1.1 | 1.1 | 1.1 | |
| Antioxidant Poly (dicyclopentadiene-co-p-cresol) | 0.6 | 0.6 | 0.6 | |
| Calcium Oxide Powder | 2 | 2 | 2 | |
| Carbon Black | 0.2 | 0.2 | 0.2 | |
| Calcium Carbonate Powder/Silicic Acid-Based Filler (Silicic Acid-Based Filler: Approx. 12%) | 14.4 | 31.5 | 30.6 | |
| Other | 2.1 | 2.6 | 3.1 | |
| Low-Temperature 0.3 kg | ○ | ○ | ○ | ○ |
| Impact Resistance 0.5 kg | X | ○ | ○ | ○ |
| 0.8 kg | X | ○ | ○ | ○ |
| 1.0 kg | X | X | X | ○ |
| 1.3 kg | X | X | X | ○ |
| 1.8 kg | X | X | X | ○ |
| 3.0 kg | X | X | X | ○ |
| Actual Car Door Test (–30° C., 60 G) | | No Data | | ○ |

In the table, the amounts for each component are denoted as mass percentages relative to the overall mass of the composition.

Actual card door test: Actual car door forcibly opened and closed.

INDUSTRIAL APPLICABILITY

The present invention can be used in any industrial field requiring a material with damping properties and low-temperature impact resistance. In particular, a composition of the present invention can be used advantageously in the vehicle construction industry and machinery construction industry.

The invention claimed is:

1. A thermally curable composition, comprising:
Component (a) comprised of:
(a1) a solid rubber in an amount of between 2.5% and 8% by mass;
(a2) an olefinic double bond-containing polymer which is liquid or pasty at 22° C., has a styrene content in a range of 10% to 60% by mass and has a glass transition temperature of –30° C. to 20° C., wherein (a2) is present in a positive amount of less than 5% by mass;
(a3) a hydrocarbon resin present in an amount of 5% to 20% by mass, in total with component (a2); and
(a4) a liquid polydiene different from (a2) in an amount of at least 15% by mass;
based on a total mass of the composition; and
Component (b) a vulcanization system comprised of at least one substance selected from the group consisting of:
(b1) sulfur and one or more accelerator(s);
(b2) a peroxidic vulcanization system or a disulfidic vulcanization system; and
(b3) quinones, quinone dioximes or dinitrosobenzene.

2. The composition according to claim 1, wherein the olefinic double bond-containing polymer which is liquid or pasty at 22° C. (a2) is a copolymer of a diene and has a glass transition temperature of –30° C. to 15° C.

3. The composition according to claim 1, wherein the olefinic double bond-containing polymer which is liquid or pasty at 22° C. (a2) has a mass average molecular weight of 1,000 to 50,000.

4. The composition according to claim 1, wherein the olefinic double bond-containing polymer which is liquid or pasty at 22° C. (a2) comprises a diene fraction, and wherein the vinyl fraction in the diene fraction is present in an amount in a range of 20 to 98 mol. %.

5. The composition according to claim 1, comprising, as the vulcanization system (b):
0.05% to 6.5% by mass of sulfur; and
0.25% to 20% by mass of the one or more accelerator(s); based on the total mass of the composition.

6. The composition according to claim 1, further comprising 10% to 45% by mass of a filler (c), based on the total mass of the composition.

7. The composition according to claim 1, further comprising 0.2% to 6% by mass a blowing agent (d), based on the total mass of the composition.

8. The composition according to claim 1, further comprising 2% to 40% by mass of a plasticizer (e), based on the total mass of the composition.

9. The composition according to claim 1, which exhibits a viscosity capable of being pumped with a pump at a temperature in a range of 15 to 60° C.

10. The composition according to claim 1, having an after curing loss factor tanδ (50 Hz) of at least 0.5 as measured by a DMA method at a temperature in a range of −20 to 0° C.

11. A thermally curable composition that is a pumpable composition at a temperature in a range of 15 to 60° C., comprising:

as a component (a):
- (a1) a solid rubber in an amount of between 2.5% and 8% by mass,
- (a2) an olefinic double bond-containing polymer which is liquid or pasty at 22° C., has a styrene content in a range of 10% to 60% by mass and has a glass transition temperature of −30° C. to 20° C. in an amount of less than 5% by mass,
- (a3) a hydrocarbon resin in an amount of, in total with said component (a2), 5% by mass or more and 20% by mass or less, and
- (a4) a liquid polydiene different from (a2) in an amount of 15% by mass or more, based on the total mass of the composition; and as a vulcanization system (b):
at least one substance selected from the group consisting of the following (b1) to (b3):
- (b1) sulfur and one or more accelerator(s),
- (b2) peroxide vulcanization system or disulfide vulcanization system, and
- (b3) quinones, quinone dioximes or dinitrosobenzene;

wherein after curing, the loss factor tanδ (50 Hz) measured by a DMA method is 0.5 or more at a temperature in the range of −20 to 0° C.

12. An acoustically attenuating material comprising the thermally curable composition of claim 1, cured to thereby form a thermoset composition.

13. An article of manufacture comprising the acoustically attenuating material of claim 12.

14. The article of manufacture of claim 13, wherein the acoustically attenuating material is an undercoating, adhesive or sealant in a vehicle, railway car or machinery.

15. A process for applying the composition according to claim 1, wherein the composition is injected by a pump to a point of application at a temperature in a range of 15 to 60° C., and is deposited in a liquid or pasty state onto a substrate.

* * * * *

UNITED STATES PATENT AND TRADEMARK OFFICE
CERTIFICATE OF CORRECTION

PATENT NO. : 10,308,791 B2
APPLICATION NO. : 15/617775
DATED : June 4, 2019
INVENTOR(S) : Makoto Ohkubo, Shingo Tsuno and Takao Tsukimori It is certified that error appears in the above-identified patent and that said Letters Patent is hereby corrected as shown below:

In the Specification

Column 13, Line 9: Change "FIG. 10" to --FIG. 1C--.

Signed and Sealed this
Tenth Day of December, 2019

Andrei Iancu
*Director of the United States Patent and Trademark Office*